Sept. 29, 1959
L. THOUREL
2,907,030
AERIALS FOR RADAR SYSTEMS
Filed Jan. 18, 1957
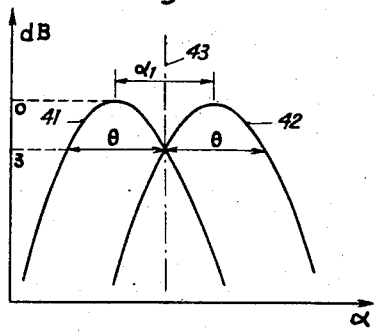
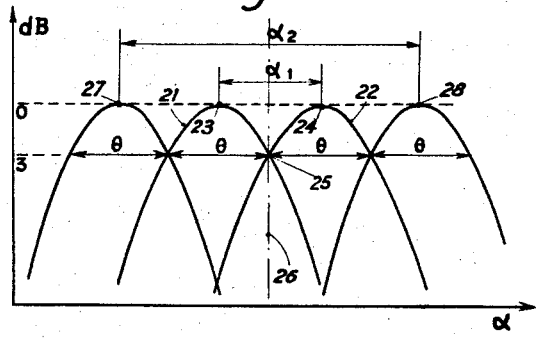
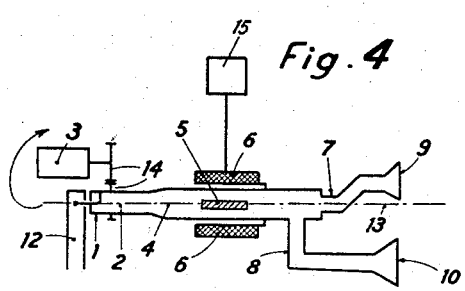
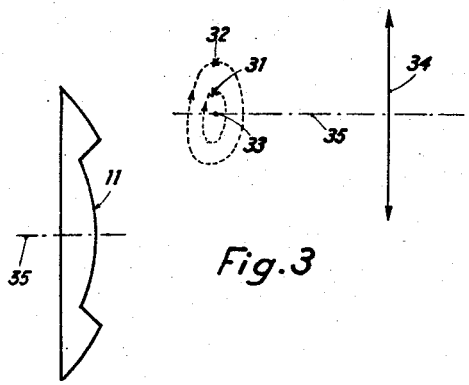

United States Patent Office 2,907,030
Patented Sept. 29, 1959

2,907,030

AERIALS FOR RADAR SYSTEMS

Léo Thourel, Paris, France, assignor to Compagnie Generale de Telegraphie Sans Fil, a corporation of France Application January 18, 1957, Serial No. 634,971

Claims priority, application France February 10, 1956

7 Claims. (Cl. 343—754)

The present invention relates to aerials for radar systems.

In certain circumstances the function of a radar is first to intercept the target by means of the transmitted radar beam, then to locate and track the target with sufficient accuracy.

These two operations, which are generally effected by means of conical scanning of space, give rise to a difficult problem: while a rapid interception of the target calls for a wide beam and a conical scanning of large opening to scan a broad space, the accuracy required in fire control calls for a narrow beam and a conical scanning of small opening to scan a limited space.

Several systems have been suggested with a view to reconciling these conflicting requirements. Such systems generally comprise several aerials and means for mechanically switching them in succession in and out in order to widen and to narrow the scanning cone according to the type of scanning desired at a given instant. These mechanical systems are slow acting and complicated and do not allow a switching frequency higher than a few tens of commutation operations per second.

It is an object of the present invention to provide a simple electrical solution to the problem under consideration.

According to a preferred embodiment of the invention, two radiators, such as horns, are fed from a common circular guide, one radiator being shifted in phase by 90° with respect to the other, and means being provided for instantaneously rotating the field propagating in the guide by 90° thus to feed selectively one or the other of the radiators. Preferably the radiators are positioned in the focal plane of an aplanatic lens which they illuminate.

According to the invention, the above means for instantaneously rotating the field is conveniently constituted by a ferrite element, shaped to provide a 90° rotation of the field and located in the magnetic field of a coil which is alternately energized and deenergized.

The invention will be better understood from the ensuing description and the appended drawing illustrating, by way of example, a non-limitative embodiment of the system according to the invention and wherein:

Fig. 1 shows the radiation pattern of a conventional gun-fire control radar-antenna;

Fig. 2 shows the radiation pattern obtained with the system according to the invention;

Fig. 3 is a perspective view diagrammatically illustrating the concentric circles described about the focus of the lens by the primary sources used according to the invention;

Fig. 4 very diagrammatically shows an embodiment of the system according to the invention.

Referring to the embodiment shown in Fig. 4, a conventional wave guide 12, which may be rectangular, is connected at one end to a radar (not shown) and at the other end to a rotative guide 4, which may be circular, through a rotating joint 1. Guide 4 is adapted to rotate about its longitudinal axis 13, the rotation being effected, for instance, by means of a motor 3 and a gear train 14 comprising a toothed rim secured on a guide 2 connecting the rotating joint 1 to, and coaxial with, guide 4.

Guide 4 contains a ferrite element 5 positioned within the magnetic field of a coil 6. This coil is carried by guide 4 and is supplied, for instance by means of a sliding contact, from a generator 15. The energy propagated in guide 4 is fed to two horns, 9 and 10, by means of rectangular wave-guide connections 7 and 8, respectively located at right angles to each other. Horns 9 and 10 illuminate a lens 11 which is preferably of the aplanatic type and coaxial with guide 4.

The system according to the invention operates as follows:

When guide 4 rotates, the respective phase centers 31 and 32 of horns 9 and 10 describe, as may be seen in Fig. 3, concentric circles about the focus 33 of lens 11, in a plane parallel to the plane 34 of lens 11 and normal to the axis 35 thereof.

Assuming, for example, that guide 12 is rectangular, the energy is propagated through guide 12 (Fig. 4) in $TE_{01}$ mode, and if guide 4 is circular, a $TE_{11}$ wave propagates therein. Accordingly, when coil 6 is not energized and the ferrite element 5 exerts no effect on the energy propagating in guide 4, the whole of the incoming energy is fed to guide 7 and horn 9 which will illuminate the lens 11 and provide a first narrow scanning cone.

When coil 6 is energized, ferrite element 5 causes the field in guide 4 to rotate. If the ferrite element 5 is so designed as to cause the field to rotate by an angle of 90°, guide 8 is coupled to circular guide 4 and substantially the whole incoming energy is transmitted to horn 10 which, in turn, will illuminate lens 11, thus providing a second wide scanning cone. The echo signal field will, of course, undergo an additional or similar rotation by 90°, impressed thereon by the ferrite element 5. This will result in a total rotation of 180° of the echo signal with respect to the initial polarization of the field in guide 12. The direction of the echo field vector is therefore directly opposite to that of the signal field and reaches normally the receiver.

Coil 6 may be conveniently fed from a conventional rectangular voltage generator, thus switching successively in and out horns 9 and 10 respectively. The frequency of this switching may easily attain several hundred cycles per second. It is even possible, if desired, to pass from one cone to the other at each pulse. Since horn 9 describes a smaller circle than horn 10 during each rotation of guide 4 it provides a scanning cone having an angle at the top $\alpha_1$ smaller than the angle at the top $\alpha_2$ of the scanning cone provided by horn 10. Thus two different scanning cones are provided at will.

When in the position of fire control, the radiation patterns, respectively obtained for diametrically opposite positions of horn 9, will be conventional patterns 41 and 42, illustrated in Fig. 1: the axis 43 of the beam describes a cone, with horn 9 at the summit of the cone, and for two positions of the beam, spaced half a rotation from each other, the intersecting point of patterns, 41 and 42, located on axis 43, is 3 db lower than the summit of the patterns, which corresponds to a beam opening $\theta$. Axis 43 of the cone is the target tracking axis of the radar system.

Patterns 41 and 42 have been reproduced at 21 and 22 in Fig. 2. The opposite positions of the axis of the radiated beams correspond to summits 23 and 24 of patterns 21 and 22, these patterns intersecting at 25 on the tracking axis 26 of the system. The opening angle of the scanning cone is $\alpha_1$.

Upon switching of the radiated energy to horn 10 this angle is brought to a higher value $\alpha_2$, corresponding to the opposite positions of the radiated beam axis represented by the angles corresponding to the maximum values 27 and 28.

Angle $\alpha_2$ is preferably chosen in such a way that patterns 21 and 22 intersect respectively with patterns 27 and 28, corresponding to horn 10, at a level 3 db lower than the maximum.

The result of the scanning of space by means of this system, as observed in the video chain of the receiver, is thus similar to that obtained with an aerial whose scanning beam opening is double, while the gain remains the same as with an opening equal to $2\theta$. Obviously the amount of information is somewhat reduced by reason of the fact that the two primary sources 9 and 10 operate alternately. This is, however, acceptable without major trouble in the application under consideration.

Sources 9 and 10 are, preferably, horns; other antennas such as artificial dielectric antennas may also be used, for instance those known as "cigar aerials."

The aplanatic lens, which is preferably used, is of known type, and may be constituted, for instance, of polyethylene or of an artificial dielectric.

Tests have been carried out with the system described hereinabove and comprising horns rotating in the focal plane of a polyethylene aplanatic lens. The lens had a diameter of 50 cm. and a focal distance of 350 mm. The following results, given by way of example only, have been observed, for both the fire control scanning and the interception scanning:

Gain factor_____percent__ 50
Pass-band _____mc./s__ 8500–9600

Level of secondary lobes over the total band: 23 db.

Although the description given hereinabove relates to what is considered as a preferred embodiment of the invention, it is by no means limitative, and various modifications and variations may be performed thereon without departing from the scope of the invention as defined in the appended claims.

What I claim is:

1. A radiating system comprising a rotatable wave guide; two radiators coupled to said wave guide and positioned for describing different concentric circles upon rotation of said wave guide; and electrical means for alternately switching the energy propagating in said wave guide between said radiators.

2. A radiating system comprising a rotable circular wave guide; two rectangular wave guides coupled to said circular wave guide at right angles to each other; two radiators connected respectively by said rectangular wave guides to said circular wave guide and positioned for describing different concentric circles upon rotation of said circular wave guide; and electrical means for rotating the direction of polarization of the field propagating in said wave guide by 90° upon energizing of said means.

3. A radiating system comprising a rotatable circular wave guide; two rectangular wave guides coupled to said circular wave guide at right angles to each other; two radiators connected respectively by said rectangular wave guides to said circular wave guide and positioned for describing different concentric circles upon rotation of said circular wave guide; a ferrite element positioned in said circular wave guide; and electrical means for alternately energizing and deenergizing said ferrite element for rotating the direction of polarization of the field by 90° between a first direction, in which said energy is fed to one of said radiators, and a second direction, in which said energy is fed to the other radiator.

4. A radiating system comprising a rotatable circular wave guide; an aplanatic lens having a focal plane; in said focal plane two radiators coupled to said wave guide and positioned for describing different concentric circles upon rotation of said wave guide; a ferrite element positioned in said wave guide and electrical means for alternately energizing and deenergizing said ferrite element for rotating by 90° the direction of polarization of the field energy propagating in said wave guide between a first position, in which said energy is fed to one of said radiators, and a second position, in which said energy is fed to the other radiator.

5. A radiating system comprising a rotatable circular wave guide; two rectangular wave guides coupled to said circular wave guide at right angles to each other; two radiators connected respectively by said rectangular wave guides to said circular wave guide and positioned for describing different concentric circles upon rotation of said circular wave guide; a coil surrounding said circular wave guide; a ferrite element positioned in said guide in the magnetic field of said coil; and means for alternately energizing and deenergizing said coil.

6. A radiating system comprising a rotatable circular wave guide; two rectangular wave guides coupled to said circular wave guide at right angles to each other; two radiators connected respectively by said rectangular wave guides to said circular wave guide and positioned for describing different concentric circles upon rotation of said circular wave guide; a coil surrounding said guide; a ferrite element positioned in said guide in the magnetic field of said coil; and electrical means for alternately energizing and deenergizing said coil to feed alternately said energy to either of said radiators.

7. A radiating system comprising a rotatable circular wave guide; two rectangular wave guides coupled to said circular wave guide at right angles to each other; two radiators connected respectively by said rectangular wave guides to said circular wave guide and positioned for describing different concentric circles upon rotation of said circular wave guide; and electrical means for alternately switching the field propagating in said circular wave guide from a first predetermined direction of polarization, for which said energy is fed to one of said radiators, to a second predetermined direction of polarization, for which said energy is fed to the other of said radiators.

References Cited in the file of this patent

FOREIGN PATENTS 1,102,590    France _____ Oct. 24, 1955